United States Patent [19]

Brooks

[11] Patent Number: 5,218,466
[45] Date of Patent: Jun. 8, 1993

[54] COMMUNICATION DEVICE WITH OPTICAL COMMUNICATION INTERFACE

[75] Inventor: Eric D. Brooks, Pompano Beach, Fla.

[73] Assignee: Motorola, Inc., Schaumburg, Ill.

[21] Appl. No.: 709,870

[22] Filed: Jun. 3, 1991

[51] Int. Cl.$^5$ ............................................. H04B 10/00
[52] U.S. Cl. .................................. 359/152; 359/145; 359/173; 455/89
[58] Field of Search ............... 359/142, 143, 144–146, 359/152, 154, 127, 173; 362/809; 340/815.03, 815.07, 815.31; 455/89, 90; 385/45

[56] References Cited

U.S. PATENT DOCUMENTS

| | | | |
|---|---|---|---|
| 4,399,563 | 8/1983 | Greenberg | 385/45 |
| 4,814,742 | 3/1989 | Morita et al. | 389/144 |
| 4,946,244 | 8/1990 | Schembri | 359/157 |
| 4,964,693 | 10/1990 | Branau, Jr. et al. | 359/173 |
| 5,063,380 | 11/1991 | Wakura | 359/142 |
| 5,075,792 | 12/1991 | Brown et al. | 359/152 |

Primary Examiner—Edward L. Coles, Sr.
Assistant Examiner—Kinfe-Michael Negash
Attorney, Agent, or Firm—M. Mansour Ghomeshi

[57] ABSTRACT

A multipurpose light apparatus (100) is described for use with an electronic device (400) for indicating the occurrence of an event and providing a programming path for the electronic device (400). The light apparatus (100) includes an indicator light source (104) for indicating the occurrence of an event and a light adapter (102) having a plurality of terminals. One of the terminals (112) of the light adapter (102) is coupled to the indicator light source (104). The light apparatus (100) also includes a light sensitive detector (108) coupled to a second terminals (114) of the light adapter (102). The light sensitive detector (108) provides the means for receiving information to program the electronic device (400).

12 Claims, 3 Drawing Sheets

COMMUNICATION DEVICE WITH OPTICAL COMMUNICATION INTERFACE

BACKGROUND OF THE INVENTION

Many electronic devices are equipped with processors and/or controllers that must be programmed for proper operation. The operating program for these devices is normally stored in non-volatile memory. In some applications, this non-volatile memory is erasable and updatable for performance improvements. The reprogramming of these devices is performed via a connector which is available for this and other optional features that the device may be equipped with. Generally, a programming device is coupled to this connector which then communicates the programming information to the device being programmed. It is obvious that while the device is being programmed no other options using the same connector can be utilized. Furthermore, as it is the nature of accessory connectors, they are highly prone to corrosion resulting in intermittences and even total failure. Additionally, as it is the nature of electrical connectors, they have limited reliability. It is clear that a need exists to provide a more reliable method of communicating programming information to a device without using their accessory connector. Optical communication between two electronic devices is well known in the art. This communication is generally provided via the use of fiber optic cables or via proximity. In the latter, the two devices having optical transmitters and receivers, are placed close to each other allowing them to communicate. Remote control appliances use this technique to establish communication between a remote control unit and the appliance in use.

As size restrictions become more predominant in the design of electronic devices, particularly portable communication devices, the approach has been a departure from dedicated interfaces. Furthermore, any additional connectors that are added to the electronic device must be sealed to protect the interior components. It is therefore clear that a need exists for an alternative programming interface that overcomes the deficiencies of the prior art.

SUMMARY OF THE INVENTION

A multipurpose light apparatus is provided for use with an electronic device for indicating the occurrence of an event and providing a programming path for the electronic device. The light apparatus includes an indicator light source for indicating the occurrence of an event and a light adapter having a plurality of terminals. One of the terminals of the light adapter is coupled to the indicator light source. The light apparatus also includes a light sensitive detector coupled to a second terminals of the light adapter. The light sensitive detector provides the means for receiving information to program the electronic device.

DESCRIPTION OF THE PREFERRED EMBODIMENT

Figure 5:
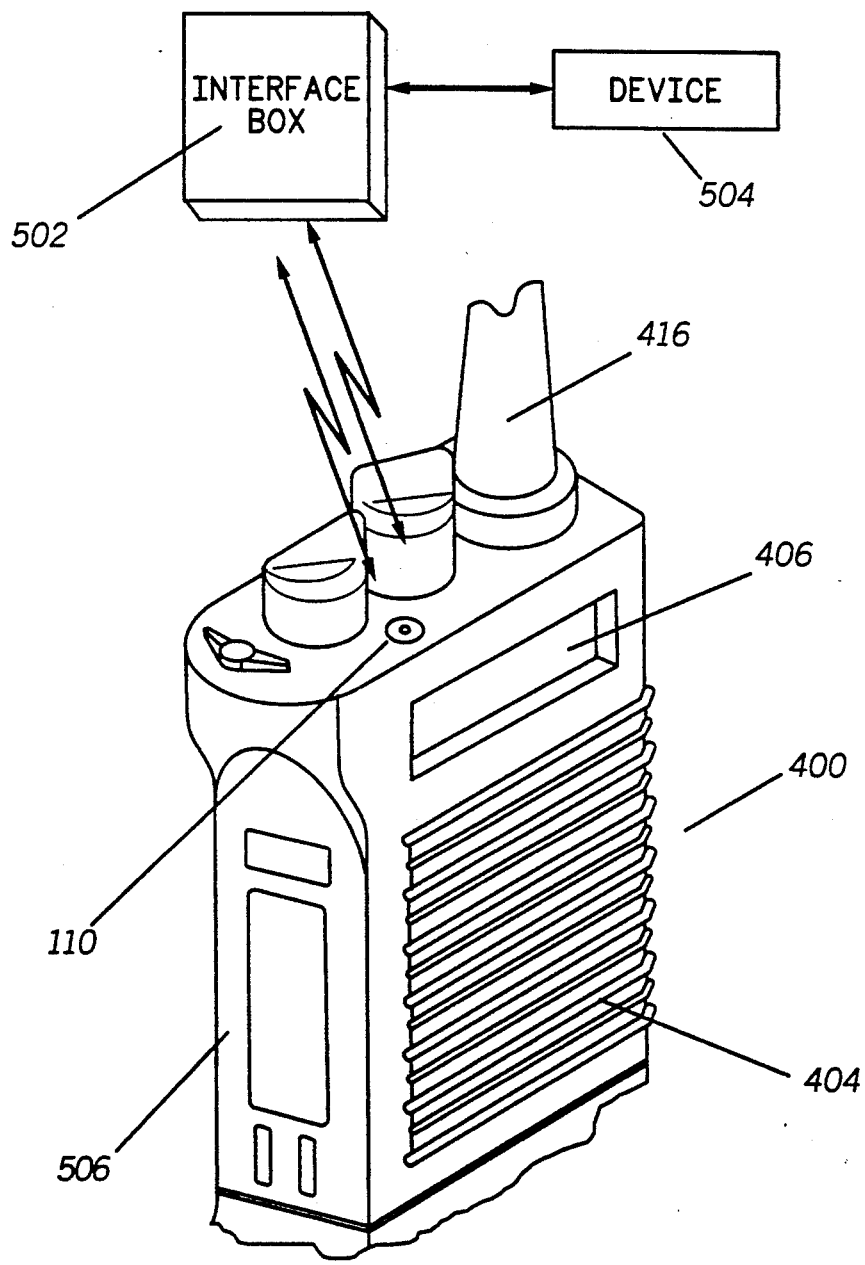
FIG. 5 is a diagram of the interface of the programming device and an electronic device in accordance with the present invention.

Referring first to FIG. 5, a combination of a data transfer or programming device 504, such as a computer and a communication device 400 is shown in accordance with the present invention. The communication device 400 may be any electronic device. In the preferred embodiment, the communication device 400 is a programmable two way transceiver. The device 400 includes a housing 506, a speaker 404, a display 406, an antenna, and an optical interface 110. The device 504 is coupled to an interface box 502. The interface box includes optical circuitry that can be coupled to the optical interface 110 of the communication device 400. This optical interface 110 is the viewing terminal of a light apparatus 100 included in the communication device 400. Programming information provided by the device 504 is presented to the interface box 502 where it is converted to optical signals. These signals are then coupled to the optical interface 110 for programming the communication device 400. Programming request information transmitted by the device 400 is optically coupled from the terminal 110 to the interface box 502 and then routed to the device 504. This may be full duplex communication at this point.

Figure 1:
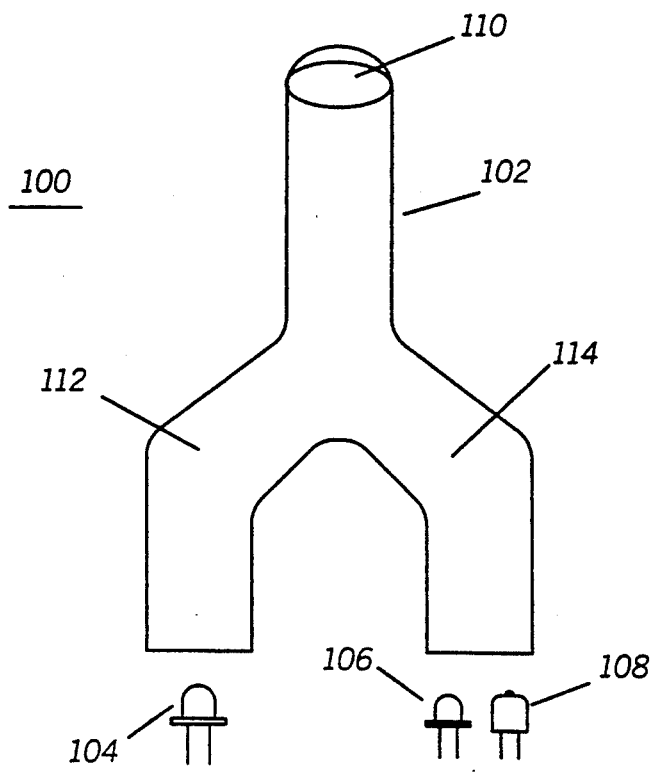
FIG. 1 is a light apparatus in accordance with the principles of the present invention.

Referring now to FIG. 1, the light apparatus 100 is shown in accordance with the present invention. The light apparatus 100 includes a light adapter or light pipe 102 having three terminals or ports. The top terminal 110 has a frosted head which is exposed to the user. Two additional terminals 112 and 114 are provided at the opposite end of the "Y" shaped light pipe 102. The material of the light pipe 102 is such that it provides optical coupling between the three terminals 110, 112, and 114. An indicator light source 104 is placed substantially close to the terminal 112 and is lit indicating the occurrence of an event. The emissions from the light 104 are coupled to the terminal 110 via the light pipe 102. The frosted head of the terminal 110 concentrates the emissions presents the indication to the user. With the use of the light pipe 102, the need to place the indicator 104 directly in the view of the user is eliminated. The indicator light source 104 is coupled to the hardware of the communication device 400 as will be discussed later. The apparatus 100 also includes a light sensitive detector 108 and a second light source 106, which are adapted for receiving and transmitting information, such as programming data, respectively. The detector 108 and the light source 106 are placed in the vicinity of the terminal 114 so as to be optically coupled to the exposed terminal 110. As was shown in FIG. 5, only terminal 110 of the light apparatus 100 is protruding outside the housing 506 of the communication device 400.

Programming or data information provided by the device 504 at the terminal 110 are received by the detector 108 and processed by the electronic hardware of the communication device 400. Programming request or other data initiated by the communication device 400 are transmitted via the source 106 and the terminal 110 to the device 504. The combination of the detector 108 and the source 106 provide a two way communication between the device 504 and the communication device 400. This two way communication may be used to communicate a host of information including but not limited to status information requested by the device 504. The light source 106 is non-visible and preferably infrared. The light sensitive detector 108 is also preferred to be an infrared receiver. The use of infrared receivers and transmitters prevent errors that may take place due to the presence of emissions from the indicator light source 104, which is in the visible range of the optical spectrum. Both light sources 104 and 106 may be light emitting diodes (LEDs) and the light sensitive detector 108 may be a photodiode of the same nature. Although, the use of incandescent lamps is also possible for the indicator 104.

Figure 2:
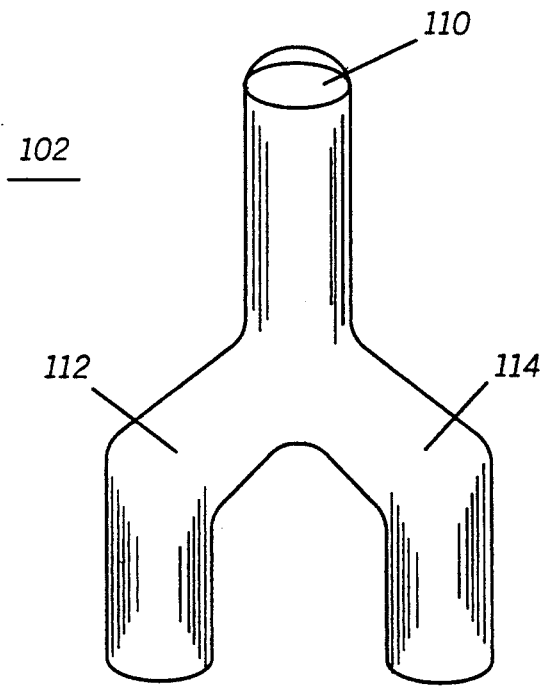
FIG. 2 is an isometric view of the light adapter in accordance with the present invention.

Referring to FIG. 2, the light pipe 102 is shown with its three terminals 110, 112, and 114. The light pipe 102 is an optical coupler in the form of a light pipe which can have many different shapes as governed by a particular application. Indeed, the use of more or less than three terminals is feasible. The latter could result into a cube shaped light pipe. The light pipe 102 could be a molded shape of transparent or translucent plastic that can act as a conduit for both visible and non-visible light. Any process can be used in the manufacture of the light adapter 102 along with a variety of material so long as they are optically conductive. The material used in the adapter 102 are determined by the frequency spectrum of the two light sources 104 and 106. With the light adapted 102, the housing of an electronic device housing it need only have one opening to accommodate the top terminal 110. There is no need for the light indicator 104 to actually penetrate the inclosure of the electronic device. The light 102 provides the optical path between the inside and the outside of the enclosure. The color or brightness of the indicator lights 106 and the sensitivity of the light detector 108 do not play a significant role in this application. This is due to the fact that the host device 504 transmitting and receiving the infrared programming information would have sufficient output and sensitivity to overcome any limitations of the device being programmed. In fact, path loss in the light pipe 102 can also be accommodated by using high power light sources. To accommodate the frosted head of the terminal 110, the interface box 502 may have a number of transmitting devices to transmit light in all directions so that a sufficient amount of light is provided to the terminal 114 and therefore the detector 108. The use of the frosted head on the terminal 110, although not necessary, is recommended for providing an omni-directional view of the visible lights 104. The use of the light pipe 102 permits the housing 506 to have one opening for the terminal 110 through which a number of features are accommodated. With only one opening provided, the task of sealing that opening is not as significant as having to seal a number of openings when the overall size of the housing 506 is brought into consideration.

To summarize, the light apparatus 100, having the light pipe 102, the visible indicator light 104, and the infrared light 106, and the infrared detector 108 is described. The light emitted by the indicator 104 enters the light pipe 102 at the terminal 112. The emitted light is optically coupled to the terminal 110 for presentation to the user. The terminal 110 is also suited to be coupled to the device 504 that is intended to communicate information such as programming data to the electronic device 400 which includes the apparatus 100. Optical programming information received at the terminal 110 is directed to the light detector 108 via the terminal 114. This information is then processed by the hardware of the electronic device 400. The light source 106 is used to provide the communication between the device 504 and the electronic device 400 in the reverse direction. Similarly, the terminal 114 receives the emitted light from the light source 106 and couples that to the terminal 110 where it is received by the device 504.

Figure 3:
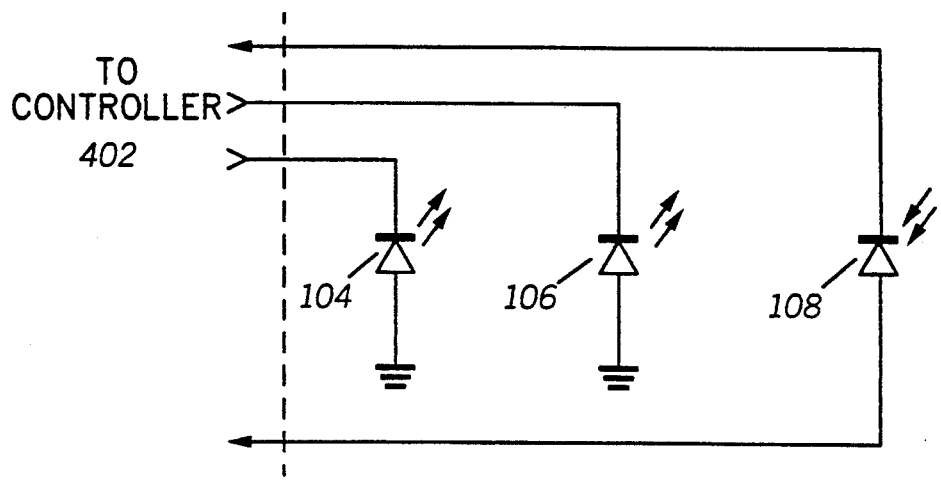
FIG. 3 is a schematic diagram of the components of the light apparatus in accordance with the present invention.

Referring now to FIG. 3, a schematic diagram 300 of the components of the light apparatus 100 is shown. The schematic 300 includes the light sources 104 and 106 and the light detector 108. The light source 104 is shown to be a visible LED while the light source 106 is an infrared LED. The light detector 108 is a photosensitive diode. From the circuit 300, there are four terminals that are brought out to a controller 402 which is a part of the communication device 400 housing the light apparatus 100. Coupled to this controller 402 are the cathodes of the LED's 104 and 106. The two terminals of the light sensitive detector 108 are also brought out to the controller 402. The anodes of the two LED's 104 and 106 are coupled to ground. Three current limiting resistors 302, 304, and 306 are placed in series with the three components 104, 106, and 108, respectively. The LED's 104 and 106 may be activated by asserting their respective terminals.

Figure 4:
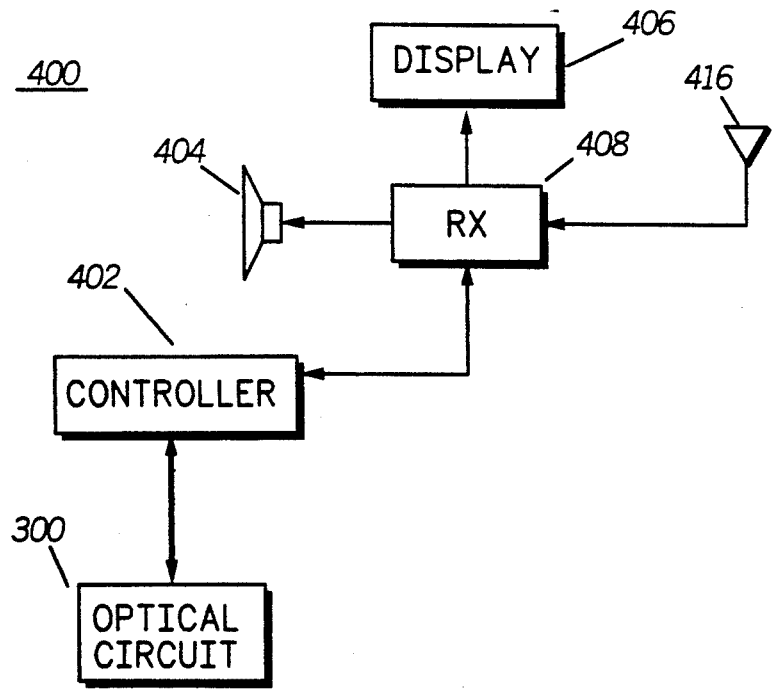
FIG. 4 is a block diagram of a communication device in accordance with the present invention.

Referring now to FIG. 4, a block diagram of the electronic device 400 is shown in accordance with the present invention. The electronic device 400 is a communication device that is used to communicate to other communication devices within a system. The communication device 400 includes the antenna 416 for receiving radio frequency communication signals. These signals are coupled to a receiver 408 where they are received and demodulated. Audio signals after being demodulated are routed to the speaker 404. The display 406 is used to display received information when it is not in the audio format. The operation of the receiver 408 is controlled by the controller 402 which is also coupled to the optical circuit 300. The controller 402 receives optical information from the optical circuit 300 and proceeds to process them according to their contents. In situations where the information received is programming data, the controller 402 proceeds to program the communication device 400 according to contents of the received programming data. A request for programming can also be initiated by the controller 402 and submitted to the optical circuit 300. The controller 402 may request and receive operating information for the communication device 400. Namely; the frequency of operation, power level, squelch level and a variety of other parameters may be requested from the device 504.

In a system comprising the device 504 and the communication device 400, the number of communication devices similar to 400 are considerably higher than the number of 504. This is due to the fact that the communication devices 400 need infrequent reprogramming. It is feasible to have a system with a very limited number of programming devices. Due to this imbalance in unit quantities in such systems, it is preferable to have the majority of components in the device 504 or the interface box 502. For this reason optical devices having higher sensitivity and more output power may be needed at the output of the interface box 502 to accommodate the sensitivity requirements of the optical devices 104, 106, and 108 inside the communication device 400. This does not pose a problem due to lack of significant restrictions on the size of the interface box 502. Furthermore, it is always advisable to use the more powerful and more expensive devices in units of a system with much lower production quantities. The infrared output at the terminal 110 of the communication device 400 would only need to be of sufficient strength for a detectable signal at the device 504. If required, lenses or other magnification devices could be used on the interface box 502 to improve coupling.

In summary, the communication device 400 is shown to include the terminal 110 of the light apparatus 100. The terminal 110 combines the light emitted from the visible indicator light 104 and that of a non-visible programming source 106. The terminal 110 also serves as coupling programming information to the detector 108. The interface box 502 couples the device 504 to this terminal 110. The combination of the visible light 104, the transmitter 106, and the receiver 108 into one output terminal 110 would allow ease of environmental sealing as the light pipe 102 could be designed with O-ring grooves to meet the required sealing conditions. Furthermore, this combination allows cableless programming of the electronic devices, thereby eliminating the needs for electrical contacts or enclosure penetrations, with an inherent potential for corrosion or leakage. A visual indicator which would be on the communication device 400 regardless of programming interface, is used as a programming port. In electronic devices that use a multi-pin connector to mate with accessories, this invention can provide programming contact between the electronic device and a programming device without disconnecting the accessories. This is significant because now the accessories can also be programmed via the optical interface of the device they are attached to. This may eliminate the need for the accessories to have any kind of optical programming capabilities.

Some of the elements included in the communication device 400 are optional features and are not necessary for the proper operation of the present invention. Although the preferred embodiment is shown to include a programming device, other embodiments which use the light apparatus 100 to communicate information other than programming data can be anticipated. In some embodiments, the principles of the present invention may be utilized to communicate data received by the receiver 408 to a host computer via the light apparatus 100. In this embodiment the communication device 400 may provide radio frequency link between two computers. The communication between the computers and their respective communication devices can be established via the optical interface as described by the present invention. In other embodiments, the status of the communication device 400 may be transmitted to a host computer via the light apparatus 100.

Although the above implementation is presented as being the preferred embodiment, it is well understood that minor modifications are possible without departing from the spirits of the present invention. Those skilled in the art appreciate the use of other circuits to produce similar results. The presentation of this preferred embodiment is aimed at rendering the principles of the present invention more understandable and shall not be construed as limitations.

I claim as my invention:

1. A communication device having a housing, comprising:
   a receiver for receiving radio communication signals;
   a controller for controlling the operation of the receiver including generating an indicator signal, the controller having means for programming the communication device coupled to the controller;
   an indicator light;
   a light sensitive device coupled to the controller means; and
   a light pipe for coupling the controller to an optical programming device and the indicator light to the outside of the housing.

2. The communication device of claim 1, further including a second light source for transmitting information to a device.

3. The communication device of claim 2, wherein the information includes programming information.

4. The communication device of claim 2, wherein the second light source comprises an infrared light source.

5. The communication device of claim 3, wherein the infrared light source is an infrared Light Emitting Diode (LED).

6. The communication device of claim 1, wherein the light pipe includes three terminals.

7. The communication device of claim 1, wherein the light sensitive detector comprises a photo diode.

8. The communication device, of claim 1, wherein the indicator light source comprises a visible LED.

9. An electronic device, comprising:
   a housing;
   controller means for controlling the operation of the electronic device, the controller having means for programming the electronic device and generating an indicator signal;
   an indicator light situated inside the housing;
   a light detecting device for receiving optical programming information, the light detecting device situated inside the housing and coupled to the controller means;
   a light pipe, including:
      a first terminal coupled to the indicator light;
      a second terminal coupled to the light detecting device; and
      a third terminal protruding out of the housing.

10. The electronic device of claim 9, wherein the light detecting device is a photo diode.

11. The electronic device of claim 9, wherein the photo diode comprises a photo diode capable of detecting non visible light.

12. The electronic device of claim 9, wherein the third terminal of the light pipe has a frosted head.

* * * * *